(12) United States Patent
Kaku (10) Patent No.: US 7,154,550 B1
(45) Date of Patent: Dec. 26, 2006

(54) ELECTRONIC CAMERA FOR QUICKLY CONFIRMING A RECORDED IMAGE

(75) Inventor: Junya Kaku, Itami (JP)

(73) Assignee: Sanyo Electric Co., Ltd, Moriguchi (JP)

( * ) Notice: Subject to any disclaimer, the term of this patent is extended or adjusted under 35 U.S.C. 154(b) by 905 days.

(21) Appl. No.: 09/629,982

(22) Filed: Jul. 31, 2000

(30) Foreign Application Priority Data

Aug. 3, 1999 (JP) .................................. 11-219964

(51) Int. Cl.
*H04N 5/222* (2006.01)
*H04N 5/225* (2006.01)

(52) U.S. Cl. .......................... 348/333.11; 348/333.01; 348/207.99; 348/222.1

(58) Field of Classification Search ........... 348/333.11, 348/333
See application file for complete search history.

(56) References Cited

U.S. PATENT DOCUMENTS

| | | | | |
|---|---|---|---|---|
| 5,497,193 | A * | 3/1996 | Mitsuhashi et al. | 348/333.01 |
| 5,760,830 | A | 6/1998 | Kinoshita et al. | 348/220 |
| 5,990,949 | A * | 11/1999 | Haruki | 348/231.99 |
| 6,512,548 | B1 * | 1/2003 | Anderson | 348/333.11 |
| 6,674,464 | B1 * | 1/2004 | Mizutani et al. | 348/333.01 |
| 2003/0193602 | A1 * | 10/2003 | Satoh et al. | 348/333.12 |

FOREIGN PATENT DOCUMENTS

| | | |
|---|---|---|
| EP | 0 802 670 | 10/1997 |
| EP | 0 893 908 A2 | 1/1999 |
| EP | 0 996 286 | 4/2000 |
| EP | 1 026 891 | 8/2000 |
| EP | 1 075 136 A2 | 2/2001 |
| JP | 02-086376 | 3/1990 |
| JP | 06-153046 | 5/1994 |
| JP | 10-145650 | 5/1998 |
| JP | 11-177866 | 7/1999 |

* cited by examiner

*Primary Examiner*—David Ometz
*Assistant Examiner*—Nhan Tran
(74) *Attorney, Agent, or Firm*—Westerman, Hattori, Daniels & Adrian, LLP.

(57) ABSTRACT

An electronic camera includes a mode change switch to select a camera mode. When the camera mode is selected by this switch, a real-time motion image of a subject is displayed on the monitor. If an operator operates the shutter button, a still image of the subject upon the operation is recorded in a compressed state to a recording medium. Furthermore, a black image is displayed on the monitor during a time period of from pressing the shutter button to a completion of recording the still image. If the shutter button remains pressed after completing the recording, a same still image as an image recorded is displayed on the monitor. The still image is kept displayed over a time the shutter button is being kept pressed.

8 Claims, 5 Drawing Sheets

ELECTRONIC CAMERA FOR QUICKLY CONFIRMING A RECORDED IMAGE

BACKGROUND OF THE INVENTION

1. Field of the Invention

This invention relates generally to electronic cameras and, more particularly, to an electronic camera for displaying, on the monitor, real-time motion images of a subject taken by an image sensor.

2. Description of the Prior Art

In the conventional electronic camera of this kind, when selecting a camera mode, real-time motion images of a subject are first displayed on the monitor. When the operator operates the shutter button (release button), a still image taken immediately after the operation by the image sensor is recorded onto a recording medium. Also, during recording, a still image same as that image is displayed on the monitor so that the operator is allowed to confirm over the monitor what still image is now being recorded.

However, there is a trend toward reduction of time in recording a still image with recent increase of signal processing rate as well as improvement of recording medium quality. In the prior art, it is accordingly impossible to exactly confirm on what still image is being recorded. In this case, if the still-image display time is prolonged to a constant extent, it is possible to carefully confirm a still image. This, however, results in a problem that picture-taking operation must be waited for upon desiring to enter a next photographic operation without confirmation of a still image.

SUMMARY OF THE INVENTION

Therefore, it is a primary object of the present invention to provide an electronic camera capable of desirably adjusting a still-image display time period.

According to the present invention, a digital camera for displaying on a monitor a real-time motion image of a subject taken by an image sensor, comprises: an instruction key for instructing to record a still image of the subject; a recorder for recording the still image to a recording medium when said instruction key is operated; a determiner for determining a state of said instruction key after operating said instruction key; and a still image displayer for displaying on said monitor the still image depending upon a result of determination by said determiner.

In a state that a real-time motion image of a subject taken by the image sensor is displayed on the monitor, if the instruction key is operated, a still image of the subject upon operating the instruction key is recorded to a recording medium by the recorder. The determiner determines a state of the operated instructing key. The still imade displayer displays on the monitor a same still image depending on a result of determination by the determiner.

The determiner repeatedly determines the state of said instruction key at predetermined timing. The still image displayer maintaining to display the still image for a time that said instruction key is in an operation state. Accordingly, an operator can carefully confirm as to what still image is recorded on the recording medium.

Where a single-colored image is displayed for a predetermined time on the monitor by a single-color image displayer after said instruction key has been operated, said determiner determines a state of said instruction key after lapse of the predetermined time. The predetermined time preferably corresponds a time required for a process of recording the still image by the recorder.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
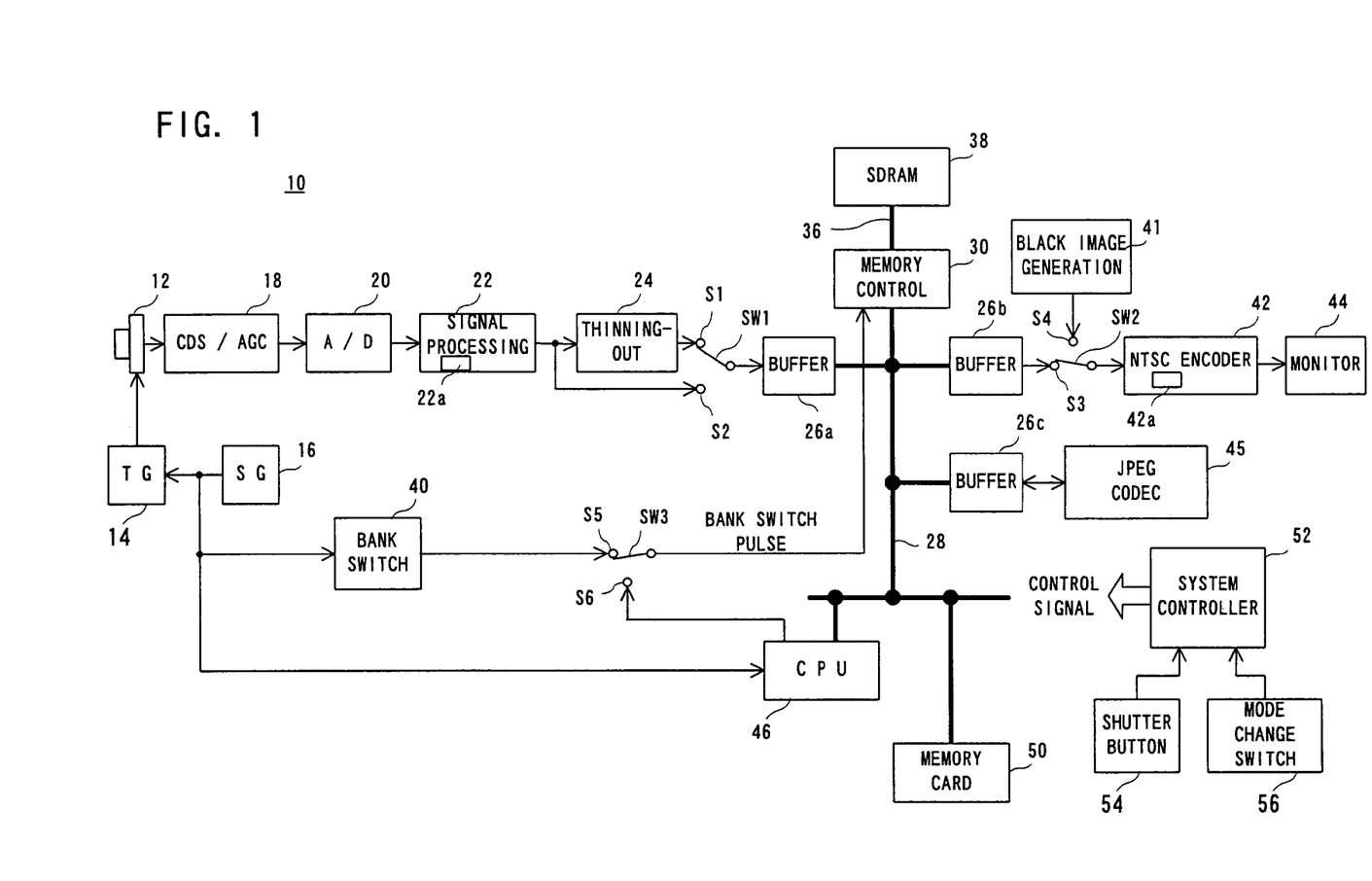
FIG. 1 is a block diagram showing one embodiment of the present invention.

Referring to FIG. 1, a digital camera 10 of this embodiment includes a CCD imager 12. The CCD imager 12 has a not-shown color filter mounted at a front thereof. An image of a subject is given to the CCD imager 12 through the color filter.

If an operator operates a mode set switch 56 to CAMERA, a system controller 52 makes setting for a camera mode. At this time, the CPU 46 starts up a signal generator (SG) 16 so that the signal generator (SG) 16 can output a horizontal synchronizing signal and vertical synchronizing signal. Based on the output horizontal and vertical synchronizing signals, a TG 14 produces a timing signal to drive the CCD imager 12 by a progressive scan scheme. The CCD imager 12 has the vertical number of lines of "1024" and the horizontal number of pixels of "768", so that a camera signal (high resolution camera signal) can be outputted with the resolution of XGA. Incidentally, it takes $1/15$th of a second to output a camera signal for each frame.

The output camera signal from the CCD imager 12 is a signal each pixel of which has any one of color components. The camera signal thus configured is subjected to well-known noise removal and level adjustment by a CDS/AGC circuit 18, and then converted into camera data as a digital signal by an A/D converter 20. A signal processor circuit 22 performs YUV conversion with a ratio of 4:2:2 on the camera data to be outputted from the A/D converter, thus creating YUV data (high resolution YUV data).

To display a real-time motion image (through-image) of a subject on the monitor 44, a switch SW1 is connected to a thinning-out circuit 24. The high-resolution YUV data outputted from the signal processor circuit 22 is thinned out by the thinning-out circuit 24, thereby converted into YUV data (low resolution YUV data) having the vertical number of lines of "768" and the horizontal number of pixels of "480". It should be noted that the pixel data not be put close together correspondingly to thinning out, and the pixel data constituting the low-resolution YUV data is intermittently outputted.

The low-resolution YUV data outputted from the thinning-out circuit 24 is sent to a buffer 26*a* via the switch SW1. The buffer 26*a* is configured by a dual port SRAM having a capacity corresponding to 128-pixels YUV data. The low resolution YUV data is consecutively written onto the buffer 26a by a buffer writing circuit 22a provided in the signal processor circuit 22. That is, the pixel data is put close together in order to eliminate missing portions incurred due to thinning out. This process provides the pixels with an equivalent pitch to that of pixels of before the thinning-out operation.

The YUV data written on the buffer 26a is read out by a memory control circuit 30 before being overwritten by the succeeding YUV data. The memory control circuit fetches the read YUV data through a bus 28, and thereafter writes it to an SDRAM 38 through a bus 36. The clock rate in reading from the buffer 26a is set 4 times a clock rate in writing to the buffer 26a. The buses 28 and 36 are occupied in transferring YUV data from the buffer 26a to the SDRAM 38 by the duration of a quarter of the total time.

The memory control circuit 30 also reads YUV data out of the SDRAM 38 through the bus 36 and writes the read YUV data to the buffer 26b through the bus 28. At this time, the clock rate in reading out of the SDRAM 38 is equal to the clock rate in writing to the SDRAM 38. Note that the buffer 26b is also configured by a dual-port SDRAM and has a capacity of storing 128 pixels of YUV data.

The NTSC encoder 42 has a buffer reading circuit 42a which reads out the YUV data stored in the buffer 26b at a clock rate of a quarter of that of writing to the buffer 26b. When outputting a through-image, the switch SW2 is connected to a terminal S3, and accordingly the YUV data read out of the buffer 26b is conveyed through the which SW2 to an NTSC encoder 42. The NTSC encoder 42 encodes the input YUV data and supplies an encoded signal to the monitor 44. As a result, through images are displayed on the monitor 44.

The operation of the memory control circuit 30 will be concretely explained with reference to FIG. 2. A read request generating circuit 22b included in the signal processor circuit 22 generates a read request at predetermined timing. A write request generating circuit 42b included in an NTSC encoder 42 also generates a write request at predetermined timing. During outputting through-images, the CPU 46 sends a high-level gate signal to AND circuits 22c and 42c. This opens the gate to thereby input read and write requests to an arbitrator circuit 30a. The arbitrator circuit 30a mediates between the requests, and outputs a predetermined start signal to the processor circuit 30b in order to respond to any of the requests.

To process the read request, the buffer control circuit 32a sends an address signal to the buffer 26a in response to the start signal and reads YUV data out of the buffer 26a. The read YUV data is fetched into the processor circuit 30b via a bus 28. An SDRAM write circuit 34a writes the fetched YUV data onto the SDRAM 38 through the bus 36. The occupation over the buses 28 and 36 at all times excludes other processing. Consequently, the processor circuit 30b outputs an end signal to the arbitrator circuit 30a each time 64-pixels YUV data has been written, thereby opening over buses 28 and 36. Then the arbitrator circuit 30a enters a next request process. In this manner, the read requests sent from signal processor circuit 22 are processed in a plurality of number of times, thereby writing 1-frame low resolution YUV data onto the SDRAM 38 in 1/15 second.

When processing a write request from the NTSC encoder 42, the arbitrator circuit 30a outputs a predetermined start signal to the processor circuit 30b in response to a write request input. An SDRAM read circuit 34b, in turn, reads YUV data out of the SDRAM 38. Also, a buffer control circuit 32b writes the YUV data read by the SDRAM 38 onto the buffer 26b. The processor circuit 30b generates an end signal when 64-pixels YUV data have been read out, similarly to the above. This puts the buses 28 and 36 open. This operation is repeatedly done, whereby 1-frame low-resolution YUV data is read out of the SDRAM 38 in 1/30th of a second.

Figure 3:
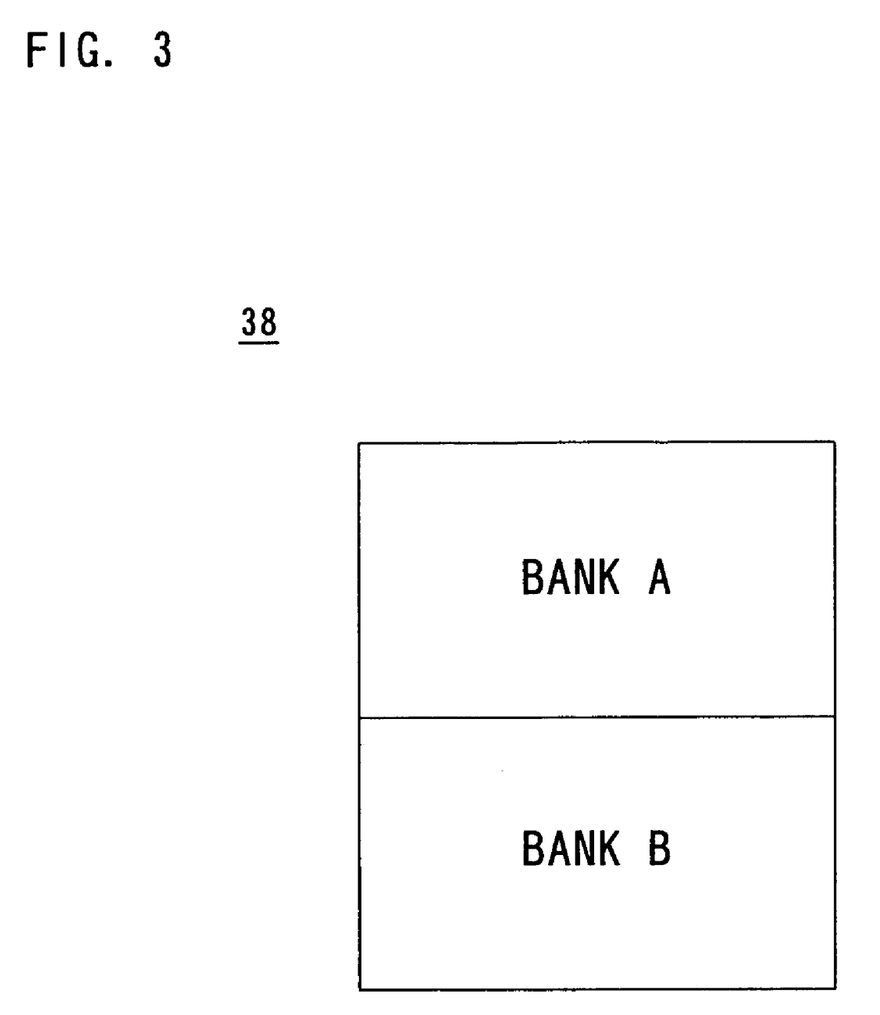
FIG. 3 is an illustrative view showing one part of an SDRAM.

The SDRAM 38 includes a bank A and a bank B, as shown in FIG. 3. A bank switch circuit 40 outputs a bank switch pulse varying in level at an interval of 1/15th of a second, based on a vertical synchronizing signal and horizontal synchronizing signal outputted from the SG16. The CPU 46 also outputs by itself a bank switch pulse. When a switch SW3 is connected to a terminal S5, a bank switch pulse outputted from the bank switch circuit 40 is supplied to the memory control circuit 30. When the switch SW3 is connected to the terminal S6, a bank switch pulse outputted from the CPU 46 is supplied to the memory control circuit 30. An SDRAM writing circuit 34a has a destination to the bank A when the bank switch pulse is high in level, and a destination to the bank B when the bank switch pulse is low in level. On the other hand, the SDRAM reading circuit 34b has a destination to the bank B when the bank switch pulse is high in level, and a destination to bank A when the bank switch pulse is low in level. That is, writing and reading operation to and from the SDRAM 38 are implemented in a complementary fashion. When data is being written to one bank, data reading is made from the other bank.

Incidentally, the switch SW3 is connected to the terminal S5 when outputting through-images, and to the terminal S6 when operating the shutter button 54 as hereafter referred to.

As discussed above, writing 1-frame YUV data requires 1/15th of a second whereas reading 1-frame YUV data completes in 1/30th of a second. On the other hand, the bank switch pulse outputted from the bank switch circuit 40 varies in level at an interval of 1/15th of a second. Consequently, during outputting through-images, while a current frame of YUV data is written to one bank, the next frame of YUV data is read out repeatedly twice from the other bank. In this manner, there is a difference in time requirement in between writing-in and reading-out. Consequently, where there is only one bank available, reading-out scanning will outpace writing-in scanning. This will result in appearance of a horizontally extending line on the monitor 44. In order to eliminate such a problem, the present embodiment provides two banks within the SDRAM 38 so that writing and reading to and from the banks can be implemented in a complementary fashion.

If the operator operates the shutter button 54, the system controller 52 detects the operation of the shutter button 54 and supplies a corresponding control signal to the CPU 46. The CPU 46 causes the switch SW1 to connect with the terminal S2, the switch SW2 to connect with the terminal S4, and the switch SW3 to connect with the terminal S6. The CPU 46 also generates by itself a high-level bank switch pulse and reduces down a gate signal to an AND circuit 42 shown in FIG. 2 to a low level, thereby applying gating to a write request. The high-resolution YUV data outputted from the signal processor circuit 22 is written, without thinned out, to the bank A of the SDRAM 38. Meanwhile, NTSC encoder 42 is given black image data outputted from a black image generator circuit 41. The NTSC encoder 42 encodes the black image data and supplies an encoded signal to the monitor 44. As a result, a black image is displayed full on a monitor 44 screen simultaneously with turning on of the shutter.

The high resolution YUV data is greater in pixel count as compared to that of low-resolution YUV data, and correspondingly requires a longer time in being written onto the SDRAM 38. However, occupation ratio over the bus 28 and 36 decreases by a degree corresponding to the non-necessity of reading data out of the SDRAM 38. The amount of reduction is allotted to writing data to the SDRAM 38. Consequently, there is no possibility of breakdown to occur during writing high-resolution YUV data to the SDRAM 38.

Figure 2:
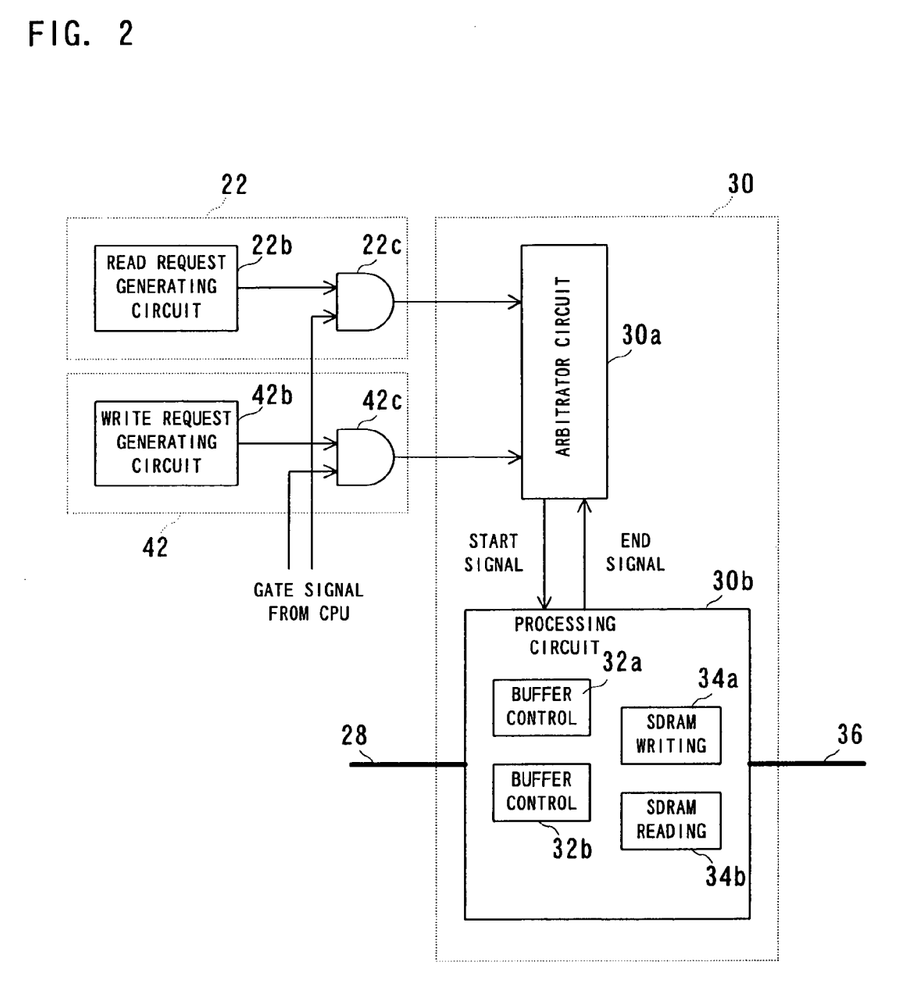
FIG. 2 is a block diagram showing one part of a memory control circuit.

Upon completing the writing of high-resolution YUV data to the SDRAM 38, i.e. elapsing ⅕th of a second after pressing the shutter button 54, the CPU 46 decreases to a low level a gate signal to the AND circuit 22c of FIG. 2. This applies gating also to a reading request, thus suspending writing operation to the SDRAM 38.

The 1 frame of high-resolution YUV data stored in the SDRAM 38 is read out by the memory control circuit 30 and supplied to the JPEG CODEC 45 through the buffer 26c. The JPEG CODEC 45 compresses the supplied high-resolution YUV data thereby creating compressed data. The compressed data is once written to the SDRAM 38 and thereafter recorded onto a memory card 50 by the CPU 46.

When recording the compressed data is completed, the shutter button 54 is determined in its state. If at this time the shutter button 54 is on, the CPU 46 returns the connection of the switch SW2 to the terminal S3 and reduces a bank switch pulse as its output to a low level, thus opening a gate to the AND circuit 42c. Due to this, the high-resolution YUV data is read out of the bank A of the SDRAM 38 by the memory control circuit 30. The read high-resolution YUV data is supplied via a buffer 26b and switch SW2 to the NTSC encoder 42. The NTSC encoder 42 encodes the high-resolution YUV data and delivers an encoded signal to the monitor 44. As a result, a same still image (freeze-image) as the still image recorded on the memory card 50 is displayed on the monitor 44. The memory control circuit 30 repeatedly reads out high-resolution YUV data as long as the shutter button 54 is on, with a result that a freeze image is kept displayed on the monitor 44.

If the operator releases his or her finger from the shutter button 54 (the shutter button 54 is turned OFF), the CPU 46 is notified from the system controller 54 that the shutter button 54 is released from the on state. The CPU 46 connects the switch SW1 to the terminal S1 and the switch SW3 to the terminal SW5. Furthermore, the CPU 46 provides a high-level gate signal to the signal processor circuit 22 to open the gate to the AND circuit 22c. The low-resolution YUV data outputted from the thinning-out circuit 24 is written to the bank A or B of the SDRAM 38 depending upon a bank switch pulse given from the bank switch circuit 40, and thereafter read out of the bank B or A depending upon the same bank switching pulse. As a result, a through-image is again displayed on the monitor 44.

Incidentally, when the freeze image is on display, the writing operation to the SDRAM 38 is kept suspended thus correspondingly providing for a vacant space over the buses 28 and 36. Accordingly, the buffer 26b will not be broken down in processing despite the high-resolution YUV data is greater in the number of pixels than the low-resolution YUV data. Also, the monitor 44 is lower in resolution than the high-resolution YUV data or low-resolution YUV data. Consequently, the NTSC encoder 42 performs thinning-out on the high-resolution YUV data and low-resolution YUV data depending upon the number of pixels thereof.

Figure 4:
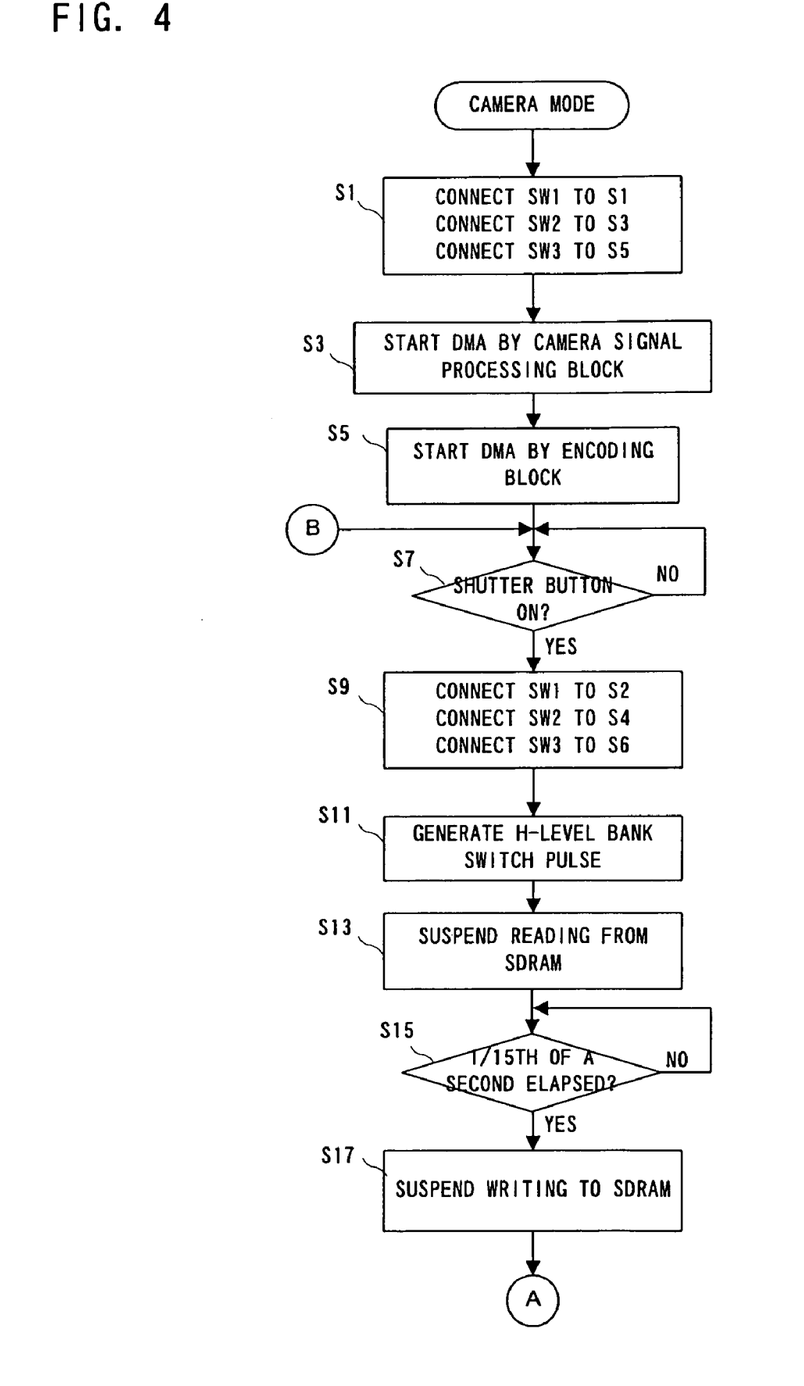
FIG. 4 is a flowchart showing one part of operation of the FIG. 1 embodiment.
Figure 5:
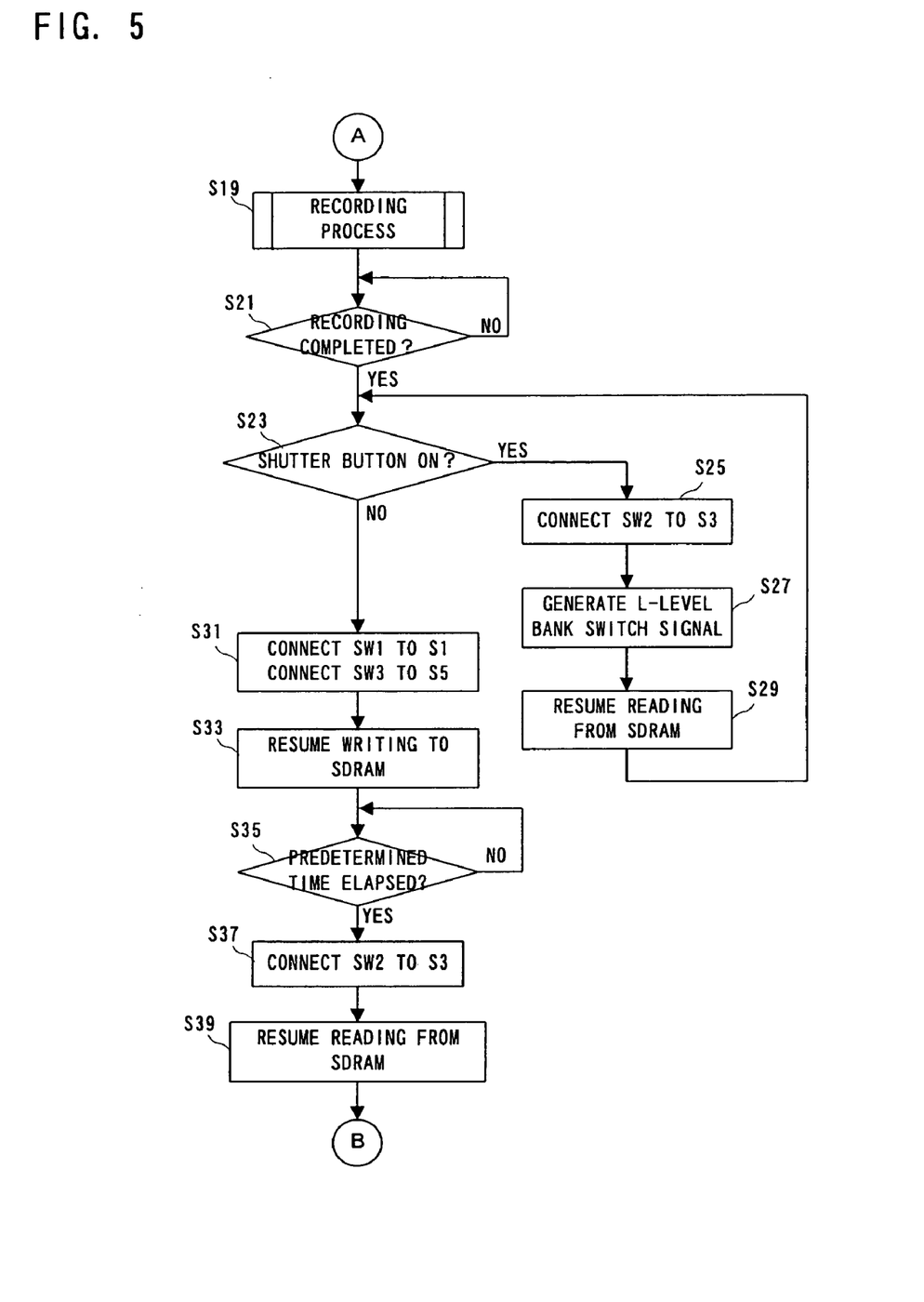
FIG. 5 is a flowchart showing another part of operation in the FIG. 1 embodiment.

The CPU 46 concretely processes a flowchart shown in FIG. 4 and FIG. 5. First, in step S1 the switches SW1, SW2 and SW3 are respectively connected to the terminals S1, S3 and S5. In respective steps S3 and S5, the camera signal processor block and the encoder block are started DMA. The DMA by the camera signal processor block is started due to starting up the SG15 and providing a high-level gate signal to the signal processor circuit 22. The DMA by the encoder block is started due to sending a high-level gate signal to the NTSC encoder 42.

The signal processor circuit 22 writes the low-resolution YUV data to the buffer 26a through the switch SW1, and supplies a read request to the memory control circuit 30. The low-resolution YUV data is written from the buffer 26a to the SDRAM 38 by the memory control circuit 30. The low-resolution YUV data written on the SDRAM 38 is read out by the memory control circuit 30 in response to a write request given from the NTSC encoder 42. The read low-resolution YUV data is written to the buffer 26b, and thereafter supplied to the NTSC encoder 42 by way of the switch SW2. The NTSC encoder 42 performs predetermined encoding processing on the low-resolution YUV data and provides an encoded signal to the monitor 44. As a result, a through-image is displayed on the monitor 44. It should be noted that which bank of the SDRAM 38 the low-resolution YUV data is to be written to or read from is determined according to a bank switching pulse outputted from the bank switch circuit 40.

When the shutter button 54 is operated by the operator, the CPU 46 in step S7 determines "YES" and in step S9 connects the switches SW1, SW2 and SW3 to the terminals S2, S4 and S6. The CPU 46 in step S11 produces by itself a high-level bank switch signal and in step S13 reduces to a low level a gate signal to be applied to the NTSC encoder 42. Due to this, the high-resolution YUV data outputted from the signal processor circuit 22 is delivered to the memory control circuit 30 by way of the buffer 26a, and written to the bank A of the SDRAM 38 by the memory control circuit 30. Meanwhile, the NTSC encoder 42 is given black image data. As a result, a black image is displayed on the monitor 44.

In step S15, it is determined whether or not ⅕th of a second has elapsed from depressing the shutter button 54. If "YES" here, in step S17 a gate signal to be supplied to the signal processor circuit 22 is reduced from high to low level. Due to this, writing to the SDRAM 38 is suspended. Subsequently, in step S19 a recording process is made for the high-resolution YUV data stored in the SDRAM 38. Completing the recording process, determination is made "YES" in step S21.

In step S23 is determined a state of the shutter button 54. Here, if the shutter button 54 is on, the process advances from the step S23 to step S25 to connect the switch SW2 to the terminal S3. Furthermore, in step S27 a low-level bank switch pulse is generated, and in step S29 a high-level gate signal is supplied to the NTSC encoder 42. As a result, high-resolution YUV data is read out of the bank A of the SDRAM 38 and delivered to the NTSC encoder 42 through the buffer 26b and switch SW2. The NTSC encoder 42 performs a predetermined encoding process on the high-resolution YUV data and supplies an encoded signal to the monitor 44. As a result, the display on the monitor 44 is changed from the black image to a freeze image. Although the process when completing the step S29 returns to the step S23, it moves from the step S23 to step S25 to repeat the above process as long as the operator keeps placing the shutter button 54. As a result, the freeze image remains displayed on the monitor 44.

If the operator puts the shutter button 54 off, the CPU 42 determines "YES" in the step S23 and advances to the step S31. In the step S31 the switches SW1 and SW3 are respectively connected to the terminals S1 and S5. In the succeeding step S33 the gate signal to be given to the signal processor circuit 22 is returned to a high level. In step S35 it is determined whether a predetermined time (e.g. 2/15th of a second) has elapsed from turning off the shutter button 54 or not. At a time point of determining "YES", the process proceeds to step S37. In the step S37 the switch SW2 is connected to the terminal S3. In the succeeding step S39 a gate signal to be given to the NTSC encoder 42 is returned to a high level. Completing the step S39, the process returned to the step S7. The processes of the steps S31 to S39 write low-resolution YUV data alternately to the bank A and bank B of the SDRAM 38 and read the same low-resolution YUV data out of the bank B and bank A. As a result, a through-image is again displayed on the monitor 44.

When the shutter button 54 is turned off before completing the compressed-data recording process, the process advances to the step S31 without passing through the process steps S25 to S29. Consequently, if the gate to the AND circuit 42c is opened immediately after determining "YES" in the step S23, high-resolution YUV data will be read out of the SDRAM 38 resulting in a fear of just momentarily displaying a freeze image on the monitor 44. From the consideration to this, the steps S37 and S39 are processed after lapse of a predetermined time (i.e. after positively writing the low-resolution YUV data to the SDRAM 38).

Incidentally, when the process moves to the step S31 through the processes of the steps S25 to S29, the switch SW2 is already in connection to the terminal S3 and the gate signal given to the NTSC encoder 42 is returned to the high level. Thus, the steps S37 and S39 are meaningless.

As can be understood from the above explanations, the camera mode if selected displays a real-time motion image of a subject is displayed on the monitor. In this state, if the operator operates the shutter button, a still picture of the subject at the operation is recorded in a compressed state to the recording medium. Furthermore, during the time period of from depressing the shutter button to completion of recording a still image, a black image is displayed on the monitor. Even after completing the recording, if the shutter button is kept pressed, a same still image as the recorded one is displayed on the monitor. This still image display is sustained while the shutter button is held pressed. When the shutter button is released from the pressing, a real-time motion image of the subject is again displayed on the monitor.

In this manner, a still image is to be displayed on the monitor depending upon an operation state of the shutter button. Accordingly, it is possible to carefully confirm as to what still image is recorded to the recording medium. Meanwhile, because turning off the shutter button displays a real-time motion image, the next still picture taking operation can be immediately entered.

Incidentally, in the embodiment signal processing is executed at all times by the signal processor circuit 22 as long as the camera mode is selected. Alternatively, the signal processing may be suspended during a time that the AND circuit 22 is given a low-level gate signal. Also, the color filter mounted on the CCD imager 12 may use any of primary colors (R, G, B) and complementary colors (Ye, Cy, Mg, G).

Meanwhile, the shutter button 54 in this embodiment uses the type that is held on while being pressed by the operator's finger, and returns to the former off state by the urging force such as by a spring when the pressing is released. However, this invention is not limited to such a button form. For example, it is possible to use a type that, if once pressed, remains on even after releasing the pressing but enters off if pressing again and releasing the pressing.

Furthermore, in the above embodiment a black image is displayed on the monitor while recording a still image. Alternatively, a blue-back image may be displayed instead of the black image. That is, any color in kind may be used provided a single-colored image.

Also, in the above embodiment thinning-out is performed with respect to both vertical and horizontal directions by the thinning-out circuit 24 in order to produce low-resolution YUV data. However, in the vertical direction, thinning-out may be made upon reading out of the CCD imager 12.

Furthermore, although above embodiment uses a CCD-type image sensor, it is needless to say that a CMOS-type image sensor is usable in place of the CCD type.

Also, in the above embodiment the display of black image is in a duration of recording a still image. The black image is renewed into a freeze or through image at a time that still image data has been recorded onto a memory card. However, in the case that the writing of still image data (photographic image data) to the SDRAM is concurrent with the writing of the still image data secured in the SDRAM to a memory card, the renewal from a black to freeze or through image may be in the stage that the still image data has been stored in the SDRAM and set instructed to be written to the memory card. That is, shifting of from a black to freeze or through-image may be made by considering the time point the instruction to write to the memory card has been set as a completion of a recording process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an outputter for repeatedly outputting an object scene image having a low resolution when an instruction key is in a non-operative state and outputting a single frame of object scene image having a high resolution before suspending an output process when said instruction key has been shifted from the non-operative state to an operative state;
   a first displayer for displaying on a monitor a moving image based on the object scene images repeatedly outputted from said outputter when said instruction key is in the non-operative state;
   a recorder for performing a recording process on the single frame of object scene image outputted from said outputter when said instruction key has been shifted from the non-operative state to the operative state;
   a second displayer for displaying on said monitor a still image based on the object scene image to be subjected to the recording process by said recorder; and
   a determiner for starting a determining process to repeatedly determine whether or not said instruction key has been restored from the operative state to the non-operative state prior to said second displayer starting a display process, and permits the display process of said second displayer when a determination result is negative, while prohibits the display process of said second displayer when the determination result is affirmative.

2. An electronic camera according to claim 1, further comprising a third displayer for displaying a default image on said monitor for a predetermined time period when said instruction key is shifted from the non-operative state to the operative state.

3. An electronic camera according to claim 2, further comprising a memory for temporarily storing the single frame of object scene image outputted from said outputter when said instruction key has been shifted from the non-operative state to the operative state, wherein each of said recorder and said second displayer reads out the single frame of object scene image from said memory.

4. An electronic camera according to claim 1, wherein each of said first displayer and said second displayer carries out a resolution converting process corresponding to the resolution of the noticed object scene image.

5. An electronic camera, comprising:
   an outputter for repeatedly outputting an object scene image having a low resolution when an instruction key is in a non-operative state and outputting a single frame of object scene image having a high resolution when said instruction key has been shifted from the non-operative state to an operative state;
   a first displayer for displaying on a monitor a moving image based on the object scene images repeatedly output from said outputter when said instruction key is in the non-operative state;
   a recorder for performing a recording process on the single frame of object scene image output from said outputter when said instruction key has been shifted from the non-operative state to the operative state;
   a second displayer for displaying on said monitor a default image in place of the moving image when said instruction key has been shifted from the non-operative state to the operative state;
   a third displayer for displaying on said monitor a still image based on the object scene image to be subjected to the recording process by said recorder after a display process of said second displayer; and
   a determiner for starting a determining process to repeatedly determine whether or not said instruction key has been restored from the operative state to the non-operative state prior to said third displayer starting a display process, and permits the display process of said third displayer when a determination result is negative, while prohibits the display process of said third displayer when the determination result is affirmative.

6. An electronic camera according to claim 5, further comprising a memory for temporarily storing the object scene image output from said outputter, wherein each of said first displayer and said third displayer carries out the display process on the object scene image stored in said memory.

7. An electronic camera, comprising:
   an outputter for repeatedly outputting an object scene image having a low resolution when an instruction key is in a non-operative state and outputting a single frame of object scene image having a high resolution when said instruction key is in an operative state;
   a first displayer for displaying on a monitor a moving image based on the object scene images repeatedly outputted from said outputter when said instruction key is in the non-operative state;
   a recorder for performing a recording process on the single frame of object scene image outputted from said outputter when said instruction key is in the operative state;
   a second displayer for displaying on said monitor a still image based on the object scene image to be subjected to the recording process by said recorder; and
   a determiner for determining, prior to starting a display process of said second displayer, whether or not said instruction key has been shifted from the operative state to the non-operative state so as to permit only said second displayer to carry out the display process during a time period of the operative state being maintained when a determination result is negative, and prohibit said second displayer from starting the display process when the determination result is affirmative.

8. An electronic camera according to claim 7, further comprising a third displayer for displaying on said monitor a default image in place of the moving image when said instruction key has been shifted from the non-operative state to the operative state, wherein said second displayer carries out a display process after a display process of said third displayer.

* * * * *